(12) United States Patent
Tang et al.

(10) Patent No.: US 12,682,908 B2
(45) Date of Patent: Jul. 14, 2026

(54) AUDIO PACKET LOSS COMPENSATION METHOD AND APPARATUS AND ELECTRONIC DEVICE

(71) Applicant: Alibaba (China) Co., Ltd., Hangzhou (CN)

(72) Inventors: Xing Tang, Hangzhou (CN); Qi Song, Hangzhou (CN); Libo Wang, Hangzhou (CN); Guilin Wu, Hangzhou (CN); Jufeng Chen, Hangzhou (CN); Changhui Wu, Hangzhou (CN)

(73) Assignee: Alibaba (China) Co., Ltd., Hangzhou (CN)

(*) Notice: Subject to any disclaimer, the term of this patent is extended or adjusted under 35 U.S.C. 154(b) by 337 days.

(21) Appl. No.: 18/341,161

(22) Filed: Jun. 26, 2023

(65) Prior Publication Data

US 2023/0343345 A1    Oct. 26, 2023

Related U.S. Application Data

(63) Continuation of application No. PCT/CN2021/140669, filed on Dec. 23, 2021.

(30) Foreign Application Priority Data

Dec. 28, 2020    (CN) .......................... 202011606515.8

(51) Int. Cl.
　　*G10L 19/005*　　　(2013.01)
　　*G10L 15/06*　　　(2013.01)
　　　　　　(Continued)

(52) U.S. Cl.
　　CPC .......... *G10L 19/005* (2013.01); *G10L 15/063* (2013.01); *G10L 15/12* (2013.01); *G10L 19/04* (2013.01)

(58) Field of Classification Search
　　CPC .............................. G10L 19/005; G10L 19/04
　　See application file for complete search history.

(56) References Cited

U.S. PATENT DOCUMENTS

| | | |
|---|---|---|
| 2018/0315438 A1 | 11/2018 | Davies et al. |
| 2023/0377584 A1* | 11/2023 | Pascual ................. G06N 3/0455 |
| 2024/0028841 A1* | 1/2024 | Li ............................ G10L 15/16 |

FOREIGN PATENT DOCUMENTS

| | | |
|---|---|---|
| CN | 101361112 A | 2/2009 |
| CN | 101366079 A | 2/2009 |

(Continued)

OTHER PUBLICATIONS

Valin, J. M., & Skoglund, J. (2019, May). LPCNet: Improving neural speech synthesis through linear prediction. In ICASSP 2019—2019 IEEE International Conference on Acoustics, Speech and Signal Processing (ICASSP) (pp. 5891-5895). IEEE.*

(Continued)

*Primary Examiner* — Bryan S Blankenagel
(74) *Attorney, Agent, or Firm* — Finnegan, Henderson, Farabow, Garrett & Dunner, LLP

(57) ABSTRACT

A method for audio packet loss compensation processing includes: acquiring time domain signals of a first number of existing audio frames in a case that an audio packet loss occurs; carrying out acoustic feature extraction on the time domain signals of the first number of the existing audio frames to generate acoustic features of the existing audio frames; carrying out semantic feature extraction on the time domain signals of the first number of the existing audio frames, and carrying out semantic understanding based on the extracted semantic features to generate semantic expressions corresponding to the existing audio frames; and predicting a time domain signal of a current audio frame (Continued)

according to the acoustic features and the semantic expressions, for audio packet loss compensation.

18 Claims, 7 Drawing Sheets

(51) Int. Cl.
*G10L 15/12* (2006.01)
*G10L 19/04* (2013.01)

(56) References Cited

FOREIGN PATENT DOCUMENTS

| | | | |
|---|---|---|---|
| CN | 101471073 | A | 7/2009 |
| CN | 104751851 | A | 7/2015 |
| CN | 111079446 | A | 4/2020 |
| CN | 111105778 | A | 5/2020 |
| CN | 111295864 | A | 6/2020 |
| CN | 111653285 | A | 9/2020 |
| CN | 111953694 | A | 11/2020 |
| CN | 113035205 | A | 6/2021 |
| EP | 2770503 | A2 | 8/2014 |
| EP | 3186809 | A1 | 7/2017 |
| KR | 20060012783 | A | 2/2006 |
| WO | WO2016016123 | A1 | 2/2016 |
| WO | WO2022143364 | A1 | 7/2022 |

OTHER PUBLICATIONS

Lee, B. K., & Chang, J. H. (2015). Packet loss concealment based on deep neural networks for digital speech transmission. IEEE/ACM Transactions on Audio, Speech, and Language Processing, 24(2), 378-387.*

Wang, Y., Ahmaniemi, A., Isherwood, D., & Huang, W. (Nov. 2003). Content-based UEP: A new scheme for packet loss recovery in music streaming. In Proceedings of the eleventh ACM international conference on Multimedia (pp. 412-421).*

PCT International Search Report and Written Opinion mailed Mar. 23, 2022, issued in corresponding International Application No. PCT/CN2021/140669 (10 pgs.).

First Chinese Search Report issued in corresponding Chinese Application No. 202011606515.8 on Sep. 28, 2021 (2 pages).

Supplemental Chinese Search Report issued in corresponding Chinese Application No. 202011606515.8 on Feb. 21, 2022 (1 page).

European Patent Office Communication issued for Application No. 21914101.7 the Supplementary European Search Report (Art. 153(7) EPC) and the European search opinion dated Jun. 20, 2024, 12 pages.

Lotfidereshgi et al., "Speech Prediction Using an Adaptive Recurrent Neural Network with Application to Packet Loss Concealment," 2018 IEEE International Conference on Acoustics, Speech and Signal Processing (ICASSP), pp. 5394-5398, 2018.

* cited by examiner

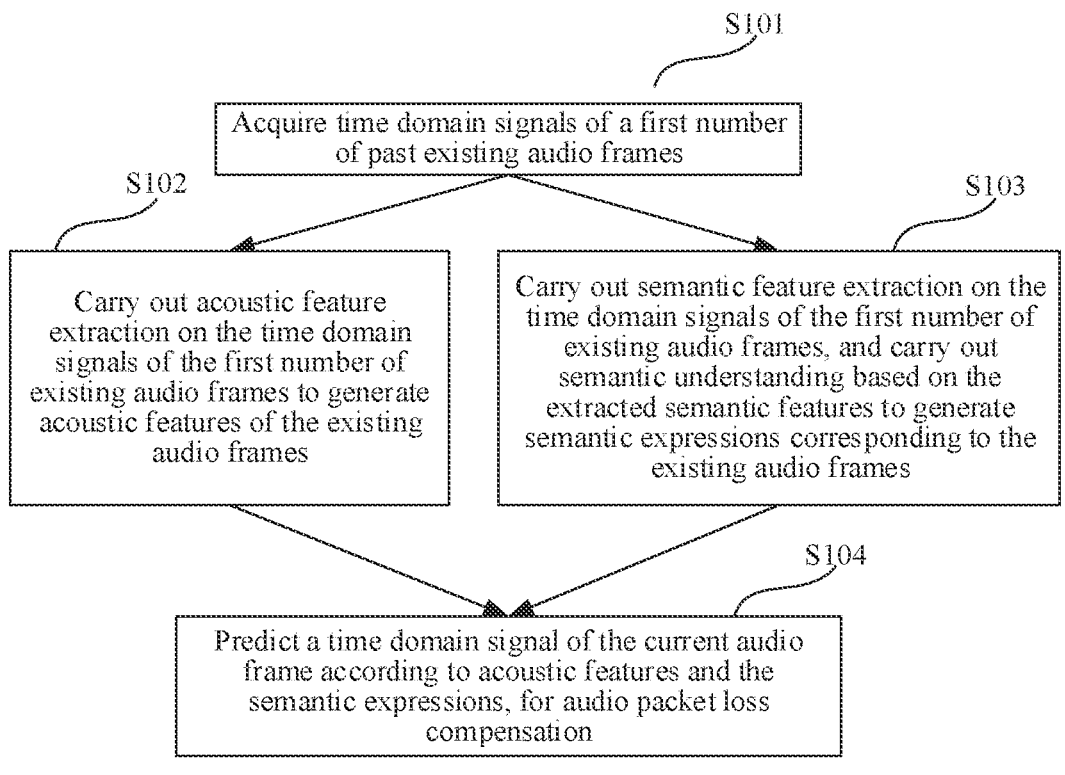

S101

Acquire time domain signals of a first number of past existing audio frames

S102

Carry out acoustic feature extraction on the time domain signals of the first number of existing audio frames to generate acoustic features of the existing audio frames

S103

Carry out semantic feature extraction on the time domain signals of the first number of existing audio frames, and carry out semantic understanding based on the extracted semantic features to generate semantic expressions corresponding to the existing audio frames

S104

Predict a time domain signal of the current audio frame according to acoustic features and the semantic expressions, for audio packet loss compensation

AUDIO PACKET LOSS COMPENSATION METHOD AND APPARATUS AND ELECTRONIC DEVICE

CROSS-REFERENCE TO RELATED APPLICATIONS

The present application claims priority to International Application No. PCT/CN2021/140669, filed Dec. 23, 2021, which claims priority to and the benefits of Chinese Patent Application No. 202011606515.8, filed on Dec. 28, 2020, both of which are incorporated herein by reference in their entireties.

TECHNICAL FIELD

This application relates to a method, an apparatus, and an electronic device for audio packet loss compensation processing, belonging to the technical field of computer technology.

BACKGROUND

Live streaming is becoming more and more important in e-commerce scenarios with its advantages of authenticity and interactivity. In addition, with the popularity of mobile terminals, the network environment for watching the live streaming is also becoming more and more complex, and the packet loss phenomenon is relatively serious. The processing capacity of a conventional audio packet loss compensation solution cannot satisfy the needs of live streaming services on a current network.

With the development of deep learning technology, some machine learning-based intelligent packet loss compensation solutions exist. However, in conventional systems, generally, frequency domain feature extraction is carried out on an audio signal, and then the audio signal is input into a machine learning model for frequency domain feature-based audio prediction. Such processing will cause loss of a mass of original information and has relatively poor accuracy on compensation for audio frames.

SUMMARY

Embodiments of the present disclosure provide a method for audio packet loss compensation processing. The method includes: acquiring time domain signals of a first number of existing audio frames in a case that an audio packet loss occurs; carrying out acoustic feature extraction on the time domain signals of the first number of the existing audio frames to generate acoustic features of the existing audio frames; carrying out semantic feature extraction on the time domain signals of the first number of the existing audio frames, and carrying out semantic understanding based on the extracted semantic features to generate semantic expressions corresponding to the existing audio frames; and predicting a time domain signal of a current audio frame according to the acoustic features and the semantic expressions, for audio packet loss compensation.

Embodiments of the present disclosure provide a method for audio packet loss compensation processing. The method includes: acquiring a time domain signal and a frame state of a current audio frame; in response to the frame state being a lost state: predicting the time domain signal of the current audio frame by using an audio prediction model according to time domain signals of a first number of existing audio frames before the current audio frame; and outputting a prediction result as the current audio frame; or in response to the frame state is an intact state: training the audio prediction model by using the time domain signal of the current audio frame and the time domain signals of the first number of the existing audio frames before the current audio frame as training data; updating the audio prediction model; and outputting the current audio frame in the intact state.

Embodiments of the present disclosure provide an electronic device. The electronic device includes: a memory configured to store a program; and one or more processors configured to run the program stored in the memory, to execute operations of the above methods for audio packet loss compensation processing.

Embodiments of the present disclosure provide a non-transitory computer-readable storage medium. The non-transitory computer-readable storage medium stores a set of instructions that are executable by one or more processors of a device to cause the device to perform the above methods for audio packet loss compensation processing.

The above description is only an overview of the technical solution of the present disclosure. In order to better understand the technical means of the present disclosure, the technical means may be implemented in accordance with the contents of the specification, and in order to make the above and other purposes, features and advantages of the present disclosure clearer and more understandable, the implementations of the present disclosure are listed below.

BRIEF DESCRIPTION OF THE DRAWINGS

FIG. 3 is a schematic flowchart of an example method for audio packet loss compensation processing according to some embodiments of the present disclosure;

DETAILED DESCRIPTION

Figure 1:
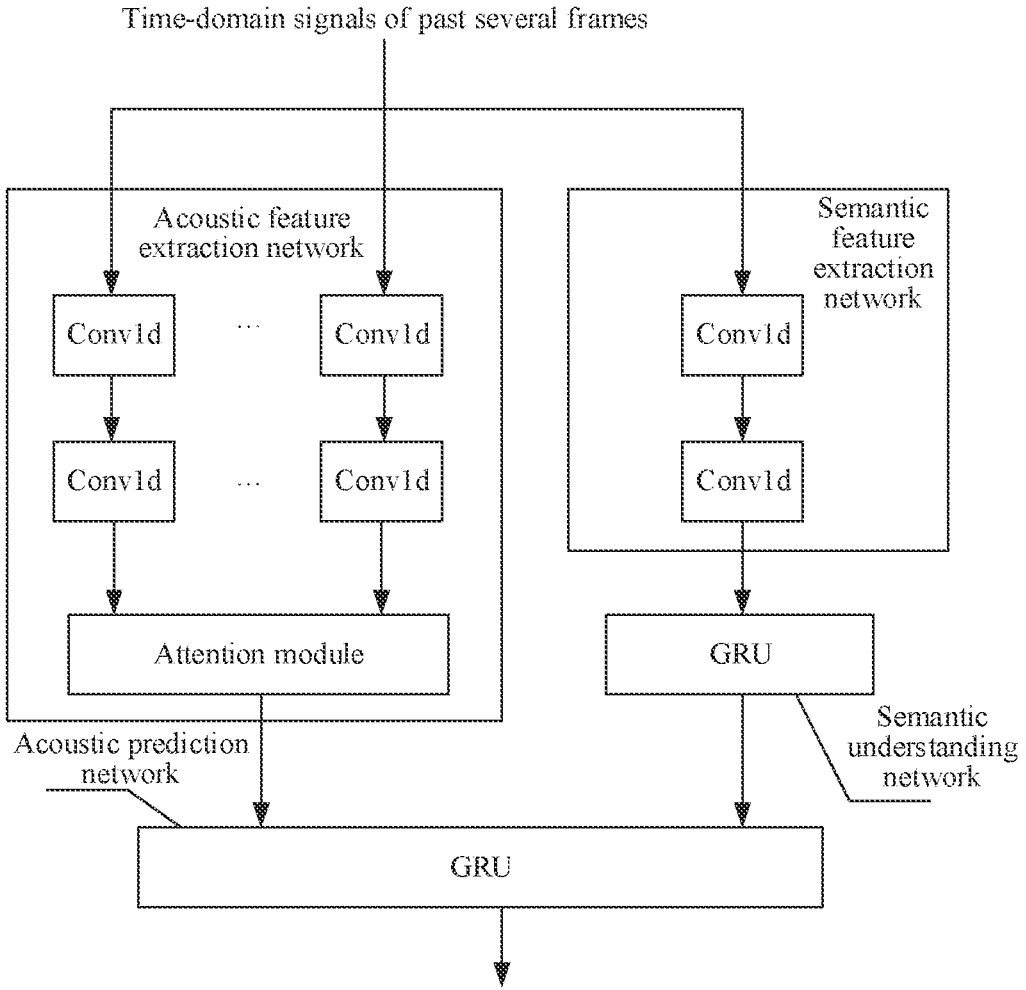
FIG. 1 is a structural schematic diagram of an example audio prediction model according to some embodiments of the present disclosure.

Hereafter, exemplary embodiments of the present disclosure are described in more detail with reference to the accompanying drawings. Although the exemplary embodiments of the present disclosure are shown in the drawings, it should be understood that the present disclosure may be implemented in various forms and should not be limited by the embodiments described herein. These embodiments are provided in order to understand the present disclosure more thoroughly and to convey the scope of the present disclosure to those skilled in the art completely.

In technical solutions of the embodiments of the present disclosure, the feature extraction can be directly carried out on an original time domain signal of an audio frame during an audio frame prediction process, which avoids information loss of the audio features, such that the predicted audio frame is more accurate and a more natural voice effect can be obtained. Furthermore, the semantic understanding assistance is also introduced during the audio frame prediction process. The semantic feature extraction is carried out based on the original time domain signal to retain more comprehensive voice information, and thus, the accuracy of the semantic understanding can be improved, and then a lost audio frame can be more accurately predicted.

As shown in FIG. 1, it is a structural schematic diagram of an example audio prediction model according to some embodiments of the present disclosure. The audio prediction model may be applied to application scenarios such as a network live streaming or video conference. The audio prediction model may be deployed at a player terminal to predict an audio frame corresponding to a packet loss part in a case that the audio packet loss occurs, so that a missing audio frame is compensated, to form consecutive voice signals.

As shown in FIG. 1, the audio prediction model in some embodiments of the present disclosure includes an acoustic feature extraction network, a semantic feature extraction network, a semantic understanding network, and an acoustic prediction network. Assuming that a current audio frame is lost, time domain signals of past multiple consecutive audio frames are input into the model to predict the current audio frame. The time domain signals of these past audio frames will be input into the acoustic feature extraction network and the semantic feature extraction network for feature extraction. On the side of the semantic feature extraction network, semantic understanding will be further carried out on the extracted semantic features by the semantic understanding network to form semantic expressions at a phoneme level. Finally, the extracted acoustic features and the semantic expressions at the phoneme level will be input into the acoustic prediction network, and a time domain signal of the current audio frame is predicted, thereby compensating the loss of the current frame.

In the above audio prediction model, input data is the time domain signal of the audio frame, not a frequency domain signal obtained after frequency domain sampling. The above processing may retain more of the original information of the audio frame, and the feature extraction is handed over to the audio prediction model for detail processing to avoid the information loss caused by the frequency domain feature extraction before the signal enters the model. In some embodiments of the present disclosure, in the acoustic feature extraction network and the semantic feature extraction network, parameters of the audio feature extraction are obtained by repeatedly training the audio prediction model through an adaptive neural network mechanism, which can make full use of the comprehensive voice information contained in the original time domain signal, so as to make more accurate audio frame prediction.

Furthermore, in the audio prediction model, in addition to carrying out audio frame prediction based on the acoustic features, a model for semantic understanding is further added (including the semantic feature extraction network and the semantic understanding network in FIG. 1). Semantic expressions corresponding to past several audio frames may be generated by the semantic feature extraction network and the semantic understanding network, thus providing important auxiliary information in terms of semantics for a subsequent voice prediction network, such that the acoustic feature information-based prediction may be more meaningful at a semantic layer.

Furthermore, the neural network may use a lightweight model at a phoneme level, which may understand semantics at the phoneme level and generate corresponding semantic expressions, such as a character or word. The phoneme level mentioned here refers to a pronunciation unit, which may be one word or half a word, for example, an initial syllable or a final syllable in Chinese, a part of a phonetic symbol of a word in English, or the like. In the processing of the semantic understanding, in the past several consecutive audio frames, only half a word or half a pronunciation of an English word may come out in the last audio frame, and through the semantic feature extraction network and semantic understanding network in FIG. 1, the whole character or word may be recognized according to the pronunciation of half the character or half the word, which can significantly improve the accuracy of a subsequent voice prediction network for audio frame prediction.

Further, as shown in FIG. 1, the acoustic feature extraction network may be of a structure of a one-dimensional convolutional network with multiple branches. Acoustic feature extraction is carried out on the time domain signals of the first number of existing audio frames by the one-dimensional convolutional network (Conv1d) with multiple branches to generate multiple low-dimensional acoustic features. Then, aggregation processing is carried out on the multiple low-dimensional acoustic features to generate acoustic features of the existing audio frames. Specifically, the aggregation processing may be carried out by using an attention module, thereby allocating a reasonable weight for low-dimensional acoustic features extracted from each branch. Furthermore, the results of the convolution calculation of multiple existing audio frames by the above one-dimensional convolutional network of each branch may be buffered for the prediction processing of subsequent audio frames. For example, taking predicting the current frame by using the past three existing audio frames as an example, it is necessary to carry out convolution processing on these three existing audio frames. If a consecutive frame loss occurs, that is, the next frame of the current audio frame is also lost, it is necessary to carry out prediction with past three frames of the next frame of the current audio frame. In this case, the convolution results of two of the past three existing audio frames will be reused. In some embodiments of the present disclosure, this repeated calculation may be avoided by a buffering mechanism for the results of the convolution calculation. The specific amount of buffered data may be set according to a specific application scenario. For example, if the current audio frame is predicted with the past three frames, the amount of buffered data may be the convolution calculation result of the past two frames.

In terms of the semantic understanding, the structure of the one-dimensional convolutional network is also employed in the example shown in FIG. 1. The semantic feature extraction is carried out on the time domain signals of the first number of existing audio frames by using the one-dimensional convolutional network, and then the semantic understanding is carried out based on the extracted semantic features by using a gated recurrent unit (GRU) network to generate the semantic expressions at the phoneme level corresponding to the existing audio frames.

Finally, a time domain signal of the current audio frame is predicted by the GRU network according to the acoustic features and the semantic expressions. Sparse model parameters may be employed in the above GRU network, thereby further reducing the calculation amount and improving the online processing rate of the model.

In some embodiments of the present disclosure, a packet loss may lead to loss of single audio frame or multiple audio frames, which depends on the number of audio frames contained in each data packet and the number of lost data packets. A single data packet may contain one audio frame or multiple audio frames, depending on different transmission protocols. In a case that loss of multiple consecutive frames occurs, in some embodiments of the present disclosure, a prediction of the consecutive frame loss may also be carried out. A current lost audio frame is predicted with past multiple audio frames, and then the next lost audio frame is predicted together with the predicted current audio frame and the past multiple audio frames, thereby implementing the prediction of the consecutive frame loss.

Figure 2:
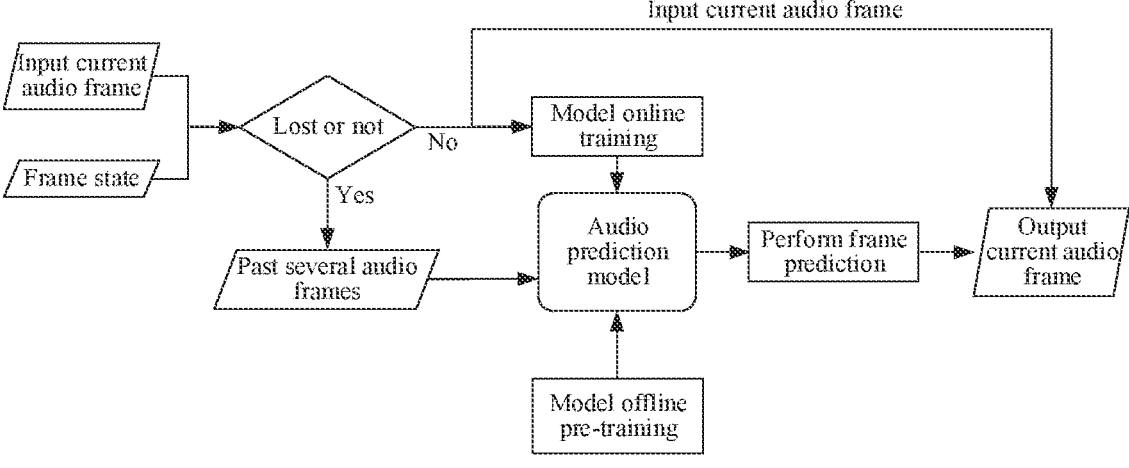
FIG. 2 is a schematic diagram of a working principle of an example online packet loss compensation processing system of according to some embodiments of the present disclosure.

As shown in FIG. 2, it is a schematic diagram of a working principle of an example audio prediction model-based online packet loss compensation processing system according to some embodiments of the present disclosure. As introduced earlier, the above audio prediction model may be deployed at the player terminal for online applications for scenarios such as a live streaming scenario.

As shown in FIG. 2, a decoder at the player terminal (not shown) is configured to decode received audio data, generate an audio frame represented by the time domain signal, and output a frame state indicating whether the audio frame is lost or not. The audio frame represented by the time domain signal mentioned here may specifically be a group of floating-point numbers. The number of the floating-point numbers depends on the number of sampling points. If the loss of frame occurs, the time domain signal of the audio frame is all-zero. But when a silence state occurs, the time domain signal of the audio frame may also be all-zero. Therefore, whether the audio frame is a lost frame or not depends on the value of the frame state. The frame state may be represented by a binary data bit. For example, 0 represents a loss of frame and 1 represents no loss of frame. The decoder may determine whether a loss of frame occurs or not in the current audio frame by the continuity of the frame number.

The audio frame (corresponding to the current audio frame input in the figure) decoded by the decoder and the frame state serve as the input of the online packet loss compensation processing system. The online packet loss compensation processing system determines further processing according to the frame state. Specifically, the online packet loss compensation processing system includes processes of two aspects. In one aspect, the audio frame is predicted when the packet loss occurs. As shown in FIG. 2, in the case that the loss of frame occurs, past several audio frames that are consecutive with the current audio frame will be acquired, and then are input into the audio prediction model to perform frame prediction processing. The number of frames input into the audio prediction model may be set according to actual needs. For example, the current audio frame may be predicted with the past three audio frames. The audio frame generated by the prediction processing of the audio prediction model will be output as the current audio frame.

In the other aspect, in the case that the loss of frame does not occur, that is, the frame is intact, online training and updating will be carried out on the model with the current audio frame and a certain number of past audio frames, and meanwhile, the input current audio frame will be output directly. The online training may include prediction training for the single frame loss and prediction training for the consecutive frame loss.

The case of the single frame loss is a relatively conventional packet loss phenomenon, and loss compensation processing for the single frame may also be applied to the case of the consecutive frame loss. Therefore, the online training will be mainly carried out for the case of the single frame loss. Specific training method may include: adjusting model parameters of the audio prediction model according to a difference between the current audio frame and an output result of a training model by taking the time domain signals of the first number of the existing audio frames that are consecutive with the current audio frame as the input of the training model.

For the case of the consecutive frame loss, targeted training is also carried out in some embodiments of the present disclosure. Specifically, the training for the consecutive frame loss may be triggered with a preset probability. Specific training methods may include: carrying out a prediction training for consecutive frame loss by using the time domain signals of the first number of the existing audio frames with an interval from the current audio frame as the input of the training model, and adjusting the model parameters of the audio prediction model according to the difference between the current audio frame and the output result of the training model. It should be noted that, the frame prediction processing in the case of the consecutive frame loss is the same as that in the case of the single frame loss, except that in the case of the consecutive frame loss, the predicted audio frame will be used as the existing audio frame for subsequent prediction of the next lost frame. For example, if three audio frames are normal at present, and a fourth frame and a fifth frame are lost, the fourth audio frame may be predicted with the past three existing audio frames, and then the fifth audio frame is predicted with the second audio frame, the third audio frame, and the predicted fourth audio frame, and so on, thereby implementing the prediction in the case of the consecutive frame loss. Specifically, in online training processing, triggered with a certain preset probability, training data will be selected as the first number of existing audio frames with a certain interval from the current audio frame. The interval mentioned here is the range of the consecutive frame loss. It is necessary to carry out frame-by-frame prediction during a training process until the current audio frame is predicted, and then the authentic current audio frame is compared with the predicted current audio frame to correct the model parameters.

Furthermore, as shown in FIG. 2, the audio prediction models used in some embodiments of the present disclosure will undergo offline training in advance before performing online processing. A larger comprehensive training dataset may be used in the offline training. The offline trained audio prediction models may satisfy the basic loss of frame prediction, and then are deployed to each player terminal. After a certain time of online training, the model can satisfy the network environment of each player terminal and the specific situations of the live streaming, including live streaming contents that are frequently played, the streamer, or the like.

Further, the above audio prediction model may also be configured in correspondence to different live streaming terminals, such that the audio prediction model may adapt to audio features of the live streaming terminal, such as the network state of the live streaming terminal and voice characteristics of the streamer, thereby carrying out a more accurate prediction in a case that an audio frame loss occurs. In order to further improve the generalization ability of the audio prediction model, fusion processing may also be carried out on multiple audio prediction models corresponding to each live streaming terminal at preset time intervals. The fused audio prediction model is updated onto the player terminal. Further, during the fusion processing process, the weight of the live streaming terminal may be increased for different live streaming terminals in a manner of weighted fusion processing, such that the fusion results have the generalization ability and also maintain the properties of a current live streaming terminal. That is, the audio prediction model at each live streaming terminal will increase its own weight during a fusion process, so that an obtained fused model still retains its own characteristics, and also takes into account the generalization ability acquired from the audio prediction models corresponding to other player terminals.

Furthermore, in the audio prediction model of some embodiments of the present disclosure, a model for semantic understanding is added. Therefore, subtitles may be generated with the model for semantic understanding from semantic understanding results of a certain number of past audio frames, thereby helping a user better receive information from the live streaming. Especially in a case that the network environment is poor, the effect of restored audio is poor, while the information can be obtained more accurately through the subtitles. Further, the above subtitle generation mechanism may also include selective processing. For example, subtitles are generated only for key statements in a live streaming process, such as key price information, conditional information, or the like. The player terminal may flexibly turn on the auxiliary technology of subtitle generation according to the network quality. For example, a subtitle generation function may be turned off in a case that the network condition is good, and the subtitle generation function may be turned on in a case that the network condition is poor. Furthermore, the user may manually select whether to load the subtitles or not through a player. The subtitle function and the above smooth processing strategy can also be applied to a scenario of a conference live streaming as well. The audio prediction model and an online packet loss compensation system used in some embodiments of the present disclosure are introduced above. In some embodiments of the present disclosure, feature extraction is directly carried out on an original time domain signal of an audio frame during an audio frame prediction process, which avoids information loss of the audio features, such that the predicted audio frame is more accurate and a more natural voice effect can be obtained. Furthermore, the semantic understanding assistance is also introduced during the audio frame prediction process. The semantic feature extraction is carried out based on the original time domain signal to retain more comprehensive voice information, and thus, the accuracy of the semantic understanding can be improved, and then a lost audio frame can be more accurately predicted. Furthermore, in terms of model applications, a mode of online training plus offline training is used. During the offline auxiliary training, a model with basic audio frame prediction ability is built by fully utilizing the generalized correlation of the voice signal, while during the online training, accurate tracking of local changes is implemented for the local high dynamic properties of the voice signal on the premise of reasonable model complexity, such that the model may be more suitable for dealing with the complex and changeable network conditions and various speaker characteristics in an actual scenario, and the problem of unstable generalization is solved.

The technical solutions of the present disclosure are further described below with some specific embodiments.

As shown in FIG. 3, it is a schematic flowchart of an example method for audio packet loss compensation processing according to some embodiments of the present disclosure. The method may be applied to live streaming scenarios, and specifically may be applied to player terminal devices such as a smartphone and a computer. The method may be implemented based on a deep neural network model shown in FIG. 1. Specifically, the method includes steps S101, S102, S103, and S104.

In step S101, time domain signals of a first number of past existing audio frames are acquired in a case that an audio packet loss occurs. In some embodiments of the present disclosure, the input audio prediction model processes the time domain signal of the audio frame rather than a frequency-sampled frequency domain signal. Such processing may retain more of the original information of the audio frame, and the feature extraction is handed over to the audio prediction model for detail processing to avoid the information loss caused by the frequency domain feature extraction before the signal enters the model. The existing audio frame is a past audio frame in time dimension relative to a current audio frame to be predicted. Generally, a current lost audio frame is predicted with several audio frames that are consecutive with the current audio frame. After the existing audio frame is obtained, acoustic feature extraction and voice feature extraction will be performed concurrently, corresponding to the steps S102 and S103 below respectively.

In step S102, the acoustic feature extraction is carried out on the time domain signals of the first number of the existing audio frames to generate acoustic features of the existing audio frames. The acoustic feature extraction may be implemented by using the acoustic feature extraction network formed by the one-dimensional convolutional network (Convld) with multiple branches. Specifically, the step may include: carrying out the acoustic feature extraction on the time domain signals of the first number of the existing audio frames by using the one-dimensional convolutional network with multiple branches to generate multiple low-dimensional acoustic features, and then, carrying out the aggregation processing on the multiple low-dimensional acoustic features to generate the acoustic features of the existing audio frame. Specifically, the aggregation processing may be carried out by using an attention module, thereby allocating reasonable weights for low-dimensional acoustic features extracted from each branch. Furthermore, the step may further include: buffering the acoustic features of a preset number of the existing audio frames for the prediction processing of subsequent audio frames. The purpose of buffering mentioned here is mainly due to the fact that when the next frame of the current audio frame is predicted in a case that the consecutive frame loss occurs, the calculated convolution results, that is, the extracted acoustic features, are also used. Repeated calculations may be reduced by buffering the extracted acoustic features. The preset number may be determined according to the actual needs, and the first number minus one may serve as the preset number. Taking predicting the current frame with the past three existing audio frames as an example, it is necessary to carry out convolution processing on these three existing audio frames to extract the acoustic features, and the acoustic features of two closest audio frames are buffered for subsequent use. This buffering will be updated continuously each time the audio frame prediction is performed.

In step S103, semantic feature extraction is carried out on the time domain signals of the first number of the existing audio frames, and semantic understanding is carried out based on the extracted semantic features to generate semantic expressions corresponding to the existing audio frames.

In terms of semantic understanding, in some embodiments of the present disclosure, feature extraction in terms of semantics may also be carried out by using the structure of the one-dimensional convolutional network, and then semantic understanding is carried out based on the extracted semantic features by using the GRU network to generate the semantic expressions at the phoneme level corresponding to the existing audio frames. The phoneme level mentioned here refers to a pronunciation unit, which may be one word or half a word, for example, an initial syllable or a final syllable in Chinese, a part of a phonetic symbol of a word in English, or the like. In the processing of the semantic understanding, in the past several consecutive audio frames, only half a word or half a pronunciation of an English word may come out in the last audio frame, and through the semantic feature extraction and semantic understanding of the embodiments of the present disclosure, the whole character or word is recognized according to the pronunciation of half the character or half the word, which can significantly improve the accuracy of a subsequent voice prediction network for audio frame prediction.

In step S104, a time domain signal of a current audio frame is predicted according to the acoustic features and the semantic expressions, for audio packet loss compensation. Final prediction processing may also be implemented by using the GRU network, and the time domain signal of the current audio frame is predicted by the GRU network according to the acoustic features and the semantic expressions. Sparse model parameters may be used in the GRU network in this part, thereby further reducing the calculation amount and improving the online processing rate of the model.

The processing method of the audio prediction in some embodiments of the present disclosure may be applied to the case of single audio frame loss, or to the case of the loss of consecutive audio frames. In a case that the loss of multiple consecutive frames occurs, the first audio frame being lost is predicted with past multiple existing audio frames, and then the next audio frame being lost is predicted together with the first audio frame as an existing audio frame and the past multiple audio frames, thereby implementing the prediction of the consecutive frame loss.

In the audio packet loss compensation processing method of some embodiments of the present disclosure, feature extraction is directly carried out on an original time domain signal of the audio frame during the audio frame prediction process, which avoids information loss of the audio features, such that the predicted audio frame is more accurate and a more natural voice effect can be obtained. Furthermore, a semantic understanding assistance is introduced during the audio frame prediction process, and semantic feature extraction is carried out based on the original time domain signal to retain more comprehensive voice information, and thus, the accuracy of semantic understanding can be improved, and then a lost audio frame can be more accurately predicted.

Figure 4:
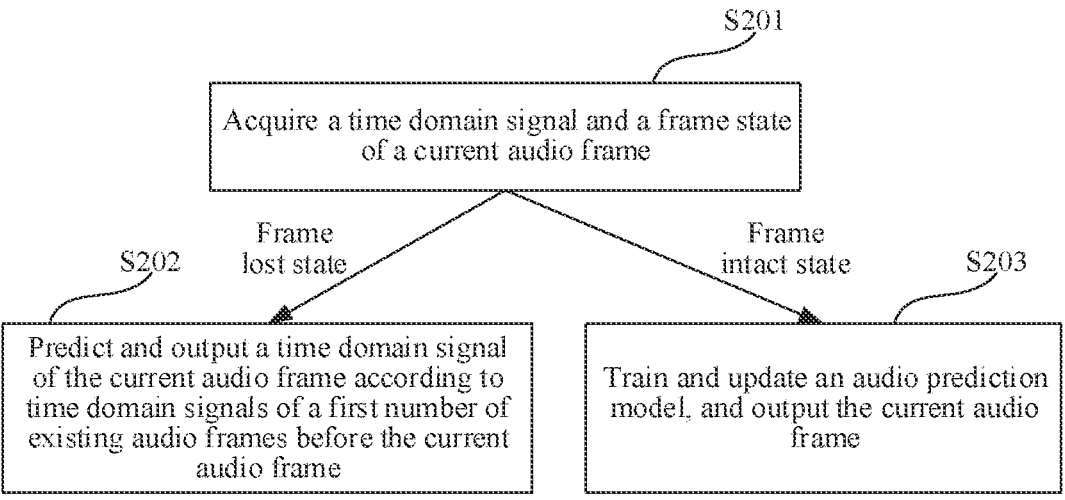
FIG. 4 is a schematic flowchart of an example method for audio packet loss compensation processing according to some other embodiments of the present disclosure.

As shown in FIG. 4, it is a schematic flowchart of an example method for audio packet loss compensation processing according to some embodiments of the present disclosure. The method may be applied to live streaming scenarios, and specifically may be applied to player terminal devices such as a smartphone and a computer. The method may predict the lost audio frame by using the audio prediction model introduced in FIG. 1 above. Specifically, the method includes steps S201, S202, and S203.

In step S201, a time domain signal and a frame state of a current audio frame are acquired. The current audio frame and the frame state are output results of the decoder at the player terminal after decoding the received audio data. The time domain signal mentioned here may specifically be a group of floating-point numbers. The number of the floating-point numbers depends on the number of sampling points. If the loss of frame occurs, the time domain signal of the audio frame is all-zero. But when a silence state occurs, the time domain signal of the audio frame may also be all-zero. Therefore, whether the audio frame is a lost frame or not depends on the value of the frame state. The frame state may be represented by a binary data bit. For example, 0 represents a loss of frame and 1 represents no loss of frame. The decoder may determine whether a loss of frame occurs or not in the current audio frame by the continuity of the frame number.

In step S202, in response to the frame state being a lost state, the time domain signal of the current audio frame is predicted by using an audio prediction model according to the time domain signals of the first number of existing audio frames before the current audio frame, and a prediction result is output as the current audio frame. The specific process of audio prediction may be the process of the foregoing embodiments. Furthermore, as introduced earlier, the prediction processing here may be prediction processing for the loss of single frame or prediction processing in a case that the consecutive frame loss occurs. For the case of the consecutive frame loss, after the current audio frame is predicted, the current audio frame is used as the existing audio frame to participate in the next round of prediction processing of the current audio frame. That is, whether for the case of the loss of single frame or for the case of the consecutive frame loss, the process flow of the processing method in these embodiments are unchanged.

In step S203, in response to the frame state being an intact state, the audio prediction model is trained by using the time domain signal of the current audio frame and the time domain signals of the first number of the existing audio frames before the current audio frame as training data, the audio prediction model is updated, and the current audio frame in the intact state is output. This step is to mainly carry out online training on the model with data without loss of frame, to continuously improve the audio prediction model. Furthermore, the audio prediction model may be a model that has been trained offline in advance. A larger comprehensive training dataset may be used in the offline training. The audio prediction models trained offline may satisfy the basic loss of frame prediction, and then are deployed to each player terminal. After a certain time of online training, the model can satisfy the network environment of each player terminal and the specific situations of the live streaming. The online training may include prediction training for the single frame loss and prediction training for the consecutive frame loss.

The case of the single frame loss is a relatively conventional packet loss phenomenon. Therefore, the online training will be mainly carried out for the case of the single frame loss. Specific training methods may include: adjusting model parameters of the audio prediction model according to a difference between the current audio frame (a non-lost frame output by the decoder) and an output result (an audio frame predicted by the model assuming that the loss of frame occurs) of a training model by taking the time domain signals of the first number of the existing audio frames that are consecutive with the current audio frame as the input of the training model.

Compared with the frequency of the case of the single frame loss, the frequency of the case of the consecutive frame loss is relatively low. Therefore, during the online training, the training for the case of the consecutive frame loss may be triggered with a preset probability. Specific training methods may include: adjusting model parameters of the audio prediction model with the preset probability according to a difference between the current audio frame (a non-lost frame output by the decoder) and an output result (an audio frame predicted by the model assuming that the consecutive frame loss occurs) of a training model by using the time domain signals of the first number of the existing audio frames with an interval from the current audio frame as the input of the training model. It should be noted that, the frame prediction processing in the case of the consecutive frame loss is the same as that in the case of the single frame loss, except that in the case of the consecutive frame loss, the predicted audio frame will be used as the existing audio frame to participate in the prediction processing of the next lost frame. The interval mentioned here is the range of the consecutive frame loss. It is necessary to carry out frame-by-frame prediction during a training process until the current audio frame is predicted, and then the authentic current audio frame (the non-lost frame output by the decoder) is compared with the predicted current audio frame (the audio frame predicted by the model assuming that the consecutive frame loss occurs), to correct the model parameters.

Furthermore, the above audio prediction model may also be configured in correspondence to different live streaming terminals, such that the audio prediction model may adapt to audio features of the live streaming terminal, such as the network state of the live streaming terminal and voice characteristics of the streamer, thereby carrying out a more accurate prediction in a case that an audio frame loss occurs. In order to further improve the generalization ability of the audio prediction model, fusion processing may also be carried out on multiple audio prediction models corresponding to each live streaming terminal at preset time intervals. The fused audio prediction model is updated onto the player terminal. Further, during the fusion processing process, the weight of the live streaming terminal may be increased for different live streaming terminals in a manner of weighted fusion processing, such that the fusion results have the generalization ability and also maintain the properties of a current live streaming terminal. That is, the audio prediction model at each live streaming terminal will increase its own weight during a fusion process, so that an obtained fused model still retains its own characteristics, and also takes into account the generalization ability acquired from the audio prediction models corresponding to other player terminals.

In the method for audio packet loss compensation processing of some embodiments of the present disclosure, a mode of online training plus offline training is used. During the offline auxiliary training, a model with basic audio frame prediction ability is built by fully utilizing the generalized correlation of the voice signal, while during the online training, accurate tracking of local changes is implemented for the local high dynamic properties of the voice signal on the premise of reasonable model complexity, such that the model may be more suitable for dealing with the complex and changeable network conditions and various speaker characteristics in an actual scenario, and the problem of unstable generalization is solved.

Figure 5:
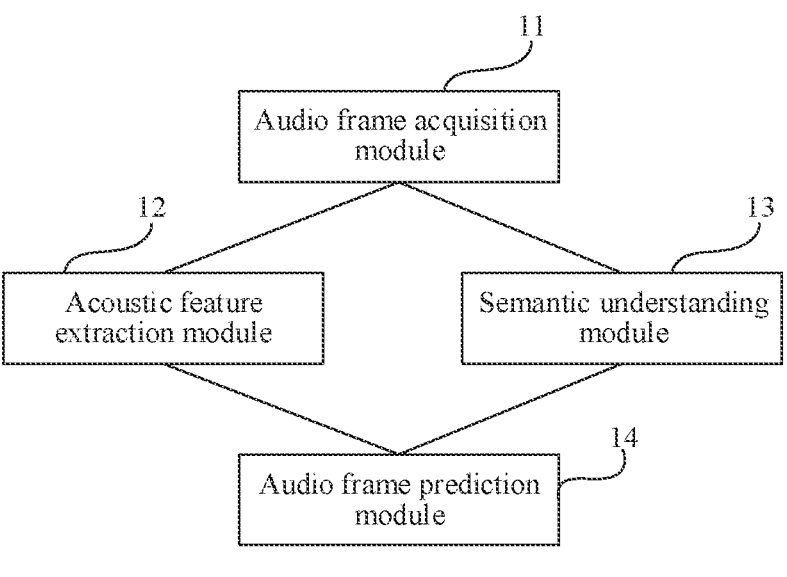
FIG. 5 is a structural schematic diagram of an example apparatus for audio packet loss compensation processing according to some embodiments of the present disclosure.

As shown in FIG. 5, it is a structural schematic diagram of an example apparatus for audio packet loss compensation processing according to some embodiments of the present disclosure. The apparatus may be applied to live streaming scenarios, and specifically may be applied to player terminal devices such as a smartphone and a computer. The apparatus may carry out processing based on a deep neural network model shown in FIG. 1. Specifically, the apparatus includes an audio frame acquisition module 11, an acoustic feature extraction module 12, a semantic understanding module 13, and an audio frame prediction module 14.

The audio frame acquisition module 11 is configured to acquire time domain signals of a first number of past existing audio frames in a case that an audio packet loss occurs. In some embodiments of the present disclosure, the input audio prediction model processes the time domain signal of the audio frame rather than a frequency-sampled frequency domain signal. Such processing may retain more of the original information of the audio frame, and the feature extraction is handed over to the audio prediction model for detail processing to avoid the information loss caused by the frequency domain feature extraction before the signal enters the model. The existing audio frame is a past audio frame in time dimension relative to a current audio frame to be predicted. Generally, a current lost audio frame is predicted with several audio frames that are consecutive with the current audio frame.

The acoustic feature extraction module 12 is configured to carry out acoustic feature extraction on the time domain signals of the first number of existing audio frames to generate acoustic features of the existing audio frames. The acoustic feature extraction may be implemented by using the acoustic feature extraction network formed by the one-dimensional convolutional network with multiple branches. Specifically, the processing in this part may include: carrying out acoustic feature extraction on the time domain signals of the first number of the existing audio frames by using the one-dimensional convolutional network with multiple branches to generate multiple low-dimensional acoustic features, and then, carrying out aggregation processing on the multiple low-dimensional acoustic features to generate the acoustic features of the existing audio frame. Specifically, the aggregation processing may be carried out by using an attention module, thereby allocating a reasonable weight for low-dimensional acoustic features extracted from each branch. Furthermore, the processing may further include: buffering the acoustic features of a preset number of the existing audio frames, for prediction processing of subsequent audio frames.

The semantic understanding module 13 is configured to carry out semantic feature extraction on the time domain signals of the first number of the existing audio frames, and carry out semantic understanding based on the extracted semantic features to generate semantic expressions corresponding to the existing audio frames. In terms of semantic understanding, in some embodiments of the present disclosure, feature extraction in terms of semantics may also be carried out by using the structure of the one-dimensional convolutional network, and then semantic understanding is carried out based on the extracted semantic features by using the GRU network to generate the semantic expressions at the phoneme level corresponding to the existing audio frames. The phoneme level here refers to a pronunciation unit, which may be one word or half a word.

The audio frame prediction module 14 is configured to predict a time domain signal of a current audio frame according to the acoustic features and the semantic expressions, for audio packet loss compensation. Final prediction processing may also be implemented by using the GRU network, and the time domain signal of the current audio frame is predicted by the GRU network according to the acoustic features and the semantic expressions. Sparse model parameters may be used in the GRU network in this part, thereby further reducing the calculation amount and improving the online processing rate of the model.

The processing apparatus of audio prediction in some embodiments of the present disclosure may be applied to the case of the single audio frame loss, or to the case of the loss of consecutive audio frames. In a case that the loss of multiple consecutive frames occurs, the first audio frame being lost is predicted with past multiple existing audio frames, and then the next audio frame being lost is predicted together with the first audio frame as an existing audio frame and the past multiple audio frames, thereby implementing the prediction of the consecutive frame loss.

The detailed description of the above processing process, the detailed description of the technical principle and the detailed analysis of the technical effect are described in details in the previous embodiments, which will not be repeated here.

In the apparatus for audio packet loss compensation processing of some embodiments of the present disclosure, feature extraction is directly carried out on an original time domain signal of the audio frame during the audio frame prediction process, which avoids information loss of the audio features, such that the predicted audio frame is more accurate and a more natural voice effect can be obtained. Furthermore, the semantic understanding assistance is introduced during the audio frame prediction process, and the semantic feature extraction is carried out based on the original time domain signal to retain more comprehensive voice information, and thus, the accuracy of the semantic understanding can be improved, and then a lost audio frame can be more accurately predicted.

Figure 6:
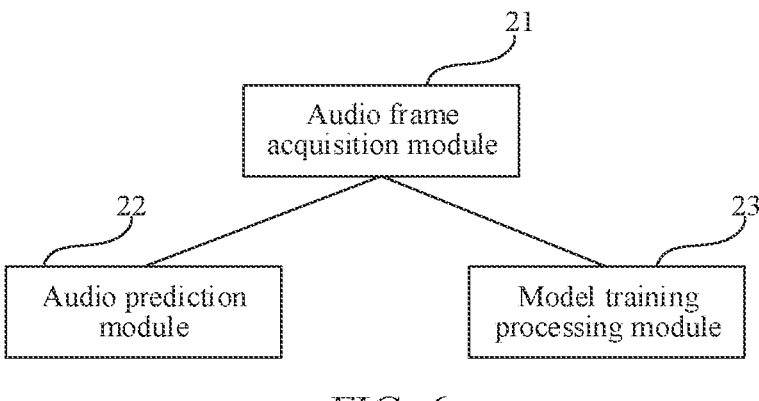
FIG. 6 is a structural schematic diagram of an example apparatus for audio packet loss compensation processing according to some other embodiments of the present disclosure.

As shown in FIG. 6, it is a structural schematic diagram of an example apparatus for audio packet loss compensation processing according to some embodiments of the present disclosure. The apparatus may be applied to live streaming scenarios, and specifically may be applied to player terminal devices such as a smartphone and a computer. The apparatus includes an audio frame acquisition module 21, an audio prediction module 22, and a model training processing module 23.

The audio frame acquisition module 21 is configured to acquire a time domain signal and a frame state of a current audio frame. The current audio frame and the frame state are output results of the decoder at the player terminal after decoding the received audio data. The time domain signal mentioned here may specifically be a group of floating-point numbers. The number of the floating-point numbers depends on the number of sampling points. If the loss of frame occurs, the time domain signal of the audio frame is all-zero. But when a silence state occurs, the time domain signal of the audio frame may also be all-zero. Therefore, whether the audio frame is a lost frame or not depends on the value of the frame state. The frame state may be represented by a binary data bit. For example, 0 represents a loss of frame and 1 represents no loss of frame. The decoder may determine whether a loss of frame occurs or not in the current audio frame by the continuity of the frame number.

The audio prediction module 22 is configured to predict the time domain signal of the current audio frame by using the audio prediction model according to the time domain signals of the first number of the existing audio frames before the current audio frame in a case that the frame state is a lost state, and output a prediction result as the current audio frame. The specific process of audio prediction may be a process of the foregoing embodiments. Furthermore, as introduced earlier, the prediction processing here may be prediction processing for the single frame loss or prediction processing in a case that the consecutive frame loss occurs. For the case of the consecutive frame loss, after the current audio frame is predicted, the current audio frame is used as an existing audio frame to participate in the next round of prediction processing of the current audio frame.

The model training processing module 23 is configured to train the audio prediction model by using the time domain signal of the current audio frame and the time domain signals of the first number of the existing audio frames before the current audio frame as training data in a case that the frame state is an intact state, update the audio prediction model, and output the current audio frame in the intact state. The processing of the model training processing module 23 is to mainly carry out online training on the model with data without loss of frame, to continuously improve the audio prediction model. The audio prediction model may be a model that has been trained offline in advance. A larger comprehensive training dataset may be used in the offline training. The audio prediction models trained offline may satisfy basic loss of frame prediction, and then are deployed to each player terminal. After a certain time of online training, the model can satisfy the network environment of each player terminal and the specific situations of the live streaming. The online training may include prediction training for the single frame loss and prediction training for the consecutive frame loss.

The case of the single frame loss is a relatively conventional packet loss phenomenon. Therefore, the online training will be mainly carried out for the case of the single frame loss. Specific training methods may include: adjusting model parameters of the audio prediction model according to a difference between the current audio frame (a non-lost frame output by the decoder) and an output result (an audio frame predicted by the model assuming that the loss of frame occurs) of a training model by taking the time domain signals of the first number of the existing audio frames that are consecutive with the current audio frame as the input of the training model.

Compared with the frequency of the case of the single frame loss, the frequency of the case of the consecutive frame loss is relatively low. Therefore, during the online training, the training for the case of the consecutive frame loss may be triggered with a preset probability. Specific training methods may include: adjusting model parameters of the audio prediction model with the preset probability according to a difference between the current audio frame (a non-lost frame output by the decoder) and an output result (an audio frame predicted by the model assuming that the consecutive frame loss occurs) of a training model by using the time domain signals of the first number of the existing audio frames with an interval from the current audio frame as the input of the training model.

In the apparatus for audio packet loss compensation processing of some embodiments of the present disclosure, a mode of online training plus offline training is used. During the offline auxiliary training, a model with basic audio frame prediction ability is built by fully utilizing the generalized correlation of the voice signal, while during the online training, accurate tracking of local changes is implemented for the local high dynamic properties of the voice signal on the premise of reasonable model complexity, such that the model may be more suitable for dealing with the complex and changeable network conditions and various speaker characteristics in an actual scenario, and the problem of unstable generalization is solved.

Figure 7:
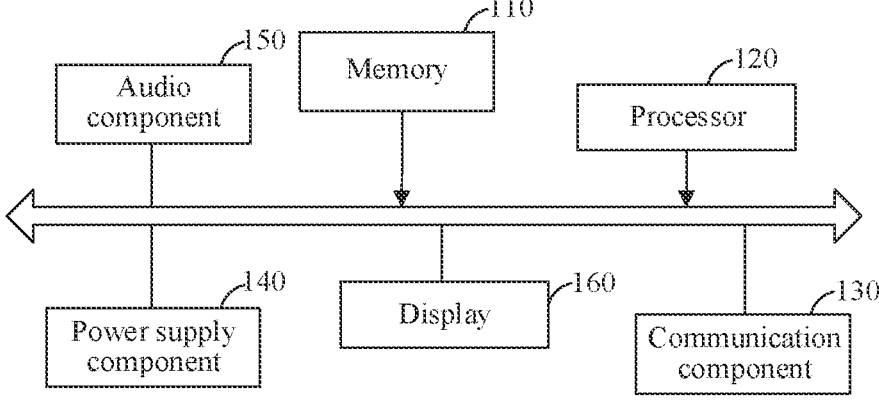
FIG. 7 is a structural schematic diagram of an example electronic device according to some embodiments of the present disclosure.

The processing flow and apparatus structures of the audio packet loss compensation are described in the above embodiments. The functions of the above methods and apparatus may be implemented by using an electronic device, as shown in FIG. 7, which is a structural schematic diagram of an example electronic device according to some embodiments of the present disclosure. Specifically, the electronic device includes a memory 110 and a processor 120.

The memory 110 is configured to store programs.

In addition to the above programs, the memory 110 may also be configured to store various other data to support operations on the electronic device. Examples of these data include instructions, contact data, phonebook data, messages, pictures, videos, and the like, for any application program or method used for operations on the electronic device.

The memory 110 may be implemented by any type of volatile or non-volatile storage devices or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or an optical disk.

The processor 120 is coupled to the memory 110, and is configured to execute the program in the memory 110, to execute the operation steps of the method for audio packet loss compensation processing described in the foregoing embodiments.

Furthermore, the processor 120 may also include various modules described in the foregoing embodiments to perform the process of the method for audio packet loss compensation processing, and the memory 110 may be, for example, configured to store data required for these modules to perform operations and/or output data.

The detailed description of the above processing process, the detailed description of the technical principle and the detailed analysis of the technical effect are described in details in the above embodiments, which will not be repeated here.

Further, as shown in the figure, the electronic device may further include a communication component 130, a power supply component 140, an audio component 150, a display 160, and other components. Only some components are shown schematically in the figure, which does not mean that the electronic device only includes the components shown in the figure.

The communication component 130 is configured to facilitate wired or wireless communication between the electronic device and other devices. The electronic device may access a communication standard-based wireless network, such as WiFi, 2G, 3G, 4G/LTE, 5G, and other mobile communication networks, or a combination thereof. In some exemplary embodiments, the communication component 130 receives a broadcast signal or broadcast related information from an external broadcast management system via a broadcast channel. In some exemplary embodiments, the communication component 130 further includes a near-field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

The power supply component 140 supplies power for various components of the electronic device. The power supply component 140 may include a power supply management system, one or more power supplies, and other components associated with generating, managing and distributing power for the electronic device.

The audio component 150 is configured to output and/or input audio signals. For example, the audio component 150 includes a microphone (MIC). When the electronic device is in an operation mode, such as a call mode, a recording mode and a voice recognition mode, the microphone is configured to receive external audio signals. The received audio signal may be further stored in the memory 110 or transmitted via the communication component 130. In some embodiments, the audio component 150 further includes a speaker configured to output the audio signals.

The display 160 includes a screen, which may include a liquid crystal display (LCD) and a touch panel (TP). If the screen includes the touch panel, the screen may be implemented as a touch screen to receive input signals from the user. The touch panel includes one or more touch sensors to sense touch, slide, and gestures on the touch panel. The touch sensor may be configured to not only sense the boundary of a touch or slide action, but also detect the duration and pressure related to the touch or slide operation.

Those of ordinary skill in the art may understand that all or some of the steps to implement the above method embodiments may be implemented by a hardware related to a program instruction. The foregoing program may be stored in a computer-readable storage medium. When the program is executed, steps of the above method embodiments are executed. The foregoing storage media include various media that may store program codes, such as a ROM, a RAM, a magnetic disk or an optical disk.

The embodiments may further be described using the following clauses:

1. A method for audio packet loss compensation processing, comprising:

acquiring time domain signals of a first number of existing audio frames in a case that an audio packet loss occurs;

carrying out acoustic feature extraction on the time domain signals of the first number of the existing audio frames to generate acoustic features of the existing audio frames;

carrying out semantic feature extraction on the time domain signals of the first number of the existing audio frames, and carrying out semantic understanding based on the extracted semantic features to generate semantic expressions corresponding to the existing audio frames; and predicting a time domain signal of a current audio frame according to the acoustic features and the semantic expressions, for audio packet loss compensation.

2. The method of clause 1, wherein: the carrying out the acoustic feature extraction on the time domain signals of the first number of the existing audio frames to generate the acoustic features of the existing audio frames comprises:

carrying out, by a one-dimensional convolutional network with multiple branches, acoustic feature extraction on the time domain signals of the first number of the existing audio frames to generate multiple low-dimensional acoustic features; and carrying out aggregation processing on the multiple low-dimensional acoustic features to generate the acoustic features of the existing audio frames.

3. The method of clause 2, wherein: the carrying out aggregation processing on the multiple low-dimensional acoustic features to generate acoustic features of the existing audio frames comprises:

aggregating, by an attention module, the multiple low-dimensional acoustic features to generate the acoustic features of the existing audio frames.

4. The method of clause 2 or clause 3, further comprising:

buffering acoustic features of a preset number of the existing audio frames, for prediction processing of subsequent audio frames.

5. The method of any of clauses 1-4, wherein: the carrying out the semantic feature extraction on the time domain signals of the first number of the existing audio frames, and carrying out the semantic understanding based on the extracted semantic features to generate the semantic expressions corresponding to the existing audio frames comprise:

carrying out, by a one-dimensional convolutional network, the semantic feature extraction on the time domain signals of the first number of the existing audio frames, and carrying out, by a GRU network, semantic understanding based on the extracted semantic features to generate the semantic expressions at a phoneme level corresponding to the existing audio frames.

6. The method of any of clauses 1-5, wherein: the predicting the time domain signal of the current audio frame according to the acoustic features and the semantic expressions comprises:

predicting, by a GRU network, the time domain signal of the current audio frame according to the acoustic features and the semantic expressions.

7. The method of clause 6, wherein the GRU network uses sparse model parameters.

8. A method for audio packet loss compensation processing, comprising:

acquiring a time domain signal and a frame state of a current audio frame;

in response to the frame state being a lost state:

predicting the time domain signal of the current audio frame by using an audio prediction model according to time domain signals of a first number of existing audio frames before the current audio frame; and outputting a prediction result as the current audio frame; or in response to the frame state is an intact state:

training the audio prediction model by using the time domain signal of the current audio frame and the time domain signals of the first number of the existing audio frames before the current audio frame as training data;

updating the audio prediction model; and outputting the current audio frame in the intact state.

9. The method of clause 8, wherein: the predicting the time domain signal of the current audio frame according to the time domain signals of the first number of the existing audio frames before the current audio frame comprises:

carrying out acoustic feature extraction on the time domain signals of the first number of the existing audio frames to generate acoustic features of the existing audio frames;

carrying out semantic feature extraction on the time domain signals of the first number of the existing audio frames, and carrying out semantic understanding based on the extracted semantic features to generate semantic expressions corresponding to the existing audio frames; and predicting the time domain signal of the current audio frame according to the acoustic features and the semantic expressions.

10. The method of clause 9, wherein: the carrying out the acoustic feature extraction on the time domain signals of the first number of the existing audio frames to generate the acoustic features of the existing audio frames comprises:

carrying out, by a one-dimensional convolutional network with multiple branches, the acoustic feature extraction on the time domain signals of the first number of the existing audio frames to generate multiple low-dimensional acoustic features; and carrying out aggregation processing on the multiple low-dimensional acoustic features to generate the acoustic features of the existing audio frames.

11. The method of clause 9 or 10, wherein: the carrying out the semantic feature extraction on the time domain signals of the first number of the existing audio frames, and carrying out the semantic understanding based on the extracted semantic features to generate the semantic expressions corresponding to the existing audio frames comprise:

carrying out, by a one-dimensional convolutional network, the semantic feature extraction on the time domain signals of the first number of the existing audio frames, and carrying out, by a GRU network, the semantic understanding based on the extracted semantic features to generate the semantic expressions at a phoneme level corresponding to the existing audio frames.

12. The method of any of clauses 9-11, wherein: the predicting the time domain signal of the current audio frame according to the acoustic features and the semantic expressions comprises:

predicting, by a GRU network, the time domain signal of the current audio frame according to the acoustic features and the semantic expressions.

13. The method of any of clauses 9-12, wherein: the training the audio prediction model by using the time domain signal of the current audio frame and the time domain signals of the first number of the existing audio frames before the current audio frame as the training data comprises:

adjusting model parameters of the audio prediction model according to a difference between the current audio frame and an output result of a training model by taking the time domain signals of the first number of the existing audio frames that are consecutive with the current audio frame as an input of the training model.

14. The method of any of clauses 9-13, wherein: the training the audio prediction model by using the time domain signal of the current audio frame and the time domain signals of the first number of the existing audio frames before the current audio frame as the training data comprises:

carrying out a prediction training for consecutive frame loss, with a preset probability, by using the time domain signals of the first number of the existing audio frames with an interval from the current audio frame as an input of a training model; and adjusting model parameters of the audio prediction model according to a difference between the current audio frame and an output result of the training model.

15. The method of any of clauses 9-14, wherein: the audio prediction model is configured in correspondence to a live streaming terminal, and the method further comprises:

carrying out fusion processing on multiple audio prediction models at a preset time interval; and configuring the fused audio prediction models in correspondence to each live streaming terminal.

16. The method of clause 15, wherein the fusion processing comprises:

carrying out weighted fusion processing on each live streaming terminal, wherein a weight value of the audio prediction model at a targeted live streaming terminal is greater than weight values of the audio prediction models at other live streaming terminals.

17. The method of any of clauses 8-16, wherein the audio prediction model is a model trained offline by using a comprehensive training data set.

18. An apparatus for audio packet loss compensation processing, comprising:

an audio frame acquisition module configured to acquire time domain signals of a first number of existing audio frames in a case that an audio packet loss occurs;

an acoustic feature extraction module configured to carry out acoustic feature extraction on the time domain signals of the first number of the existing audio frames to generate acoustic features of the existing audio frames;

a semantic understanding module configured to carry out semantic feature extraction on the time domain signals of the first number of the existing audio frames, and carry out semantic understanding based on the extracted semantic features to generate semantic expressions corresponding to the existing audio frames; and an audio frame prediction module, configured to predict a time domain signal of a current audio frame according to the acoustic features and the semantic expressions, for audio packet loss compensation.

19. The apparatus according to clause 18, wherein: the carrying out the acoustic feature extraction on the time domain signals of the first number of the existing audio frames to generate acoustic features of the existing audio frames comprises:

carrying out, by a one-dimensional convolutional network with multiple branches, acoustic feature extraction on the time domain signals of the first number of the existing audio frames to generate multiple low-dimensional acoustic features; and carrying out aggregation processing on the multiple low-dimensional acoustic features to generate acoustic features of the existing audio frames.

20. The apparatus according to clause 19, wherein: the carrying out aggregation processing on the multiple low-dimensional acoustic features to generate acoustic features of the existing audio frames comprises:

aggregating, by an attention module, the multiple low-dimensional acoustic features to generate acoustic features of the existing audio frames.

21. The apparatus according to any of clauses 18-20, wherein: the carrying out the semantic feature extraction on the time domain signals of the first number of the existing audio frames, and carrying out the semantic understanding based on the extracted semantic features to generate semantic expressions corresponding to the existing audio frames comprise:

carrying out, by a one-dimensional convolutional network, the semantic feature extraction on the time domain signals of the first number of the existing audio frames, and carrying out, by a GRU network, semantic understanding based on the extracted semantic features to generate semantic expressions at a phoneme level corresponding to the existing audio frames.

22. The apparatus according to any of clauses 18-21, wherein: the predicting a time domain signal of a current audio frame according to the acoustic features and the semantic expressions comprises:

predicting, by a GRU network, the time domain signal of the current audio frame according to the acoustic features and the semantic expressions.

23. An apparatus for audio packet loss compensation processing, comprising:

an audio frame acquisition module, configured to acquire a time domain signal and a frame state of a current audio frame;

an audio prediction module, configured to predict the time domain signal of the current audio frame by using the audio prediction model according to the time domain signals of a first number of existing audio frames before the current audio frame in a case that the frame state is a lost state, and output a prediction result as the current audio frame; and a model training processing module, configured to train the audio prediction model by using the time domain signal of the current audio frame and the time domain signals of the first number of the existing audio frames before the current audio frame as training data in a case that the frame state is an intact state, update the audio prediction model, and output the current audio frame in the intact state.

24. The apparatus according to clause 23, wherein the training the audio prediction model by using the time domain signal of the current audio frame and the time domain signals of the first number of the existing audio frames before the current audio frame as the training data comprises:

adjusting model parameters of the audio prediction model according to a difference between the current audio frame and an output result of a training model by taking the time domain signals of the first number of the existing audio frames that are consecutive with the current audio frame as an input of the training model.

25. The apparatus according to clause 23 or 24, wherein the training the audio prediction model by using the time domain signal of the current audio frame and the time domain signals of the first number of the existing audio frames before the current audio frame as the training data comprises:

carrying out a prediction training for a consecutive frame loss, with a preset probability, by using the time domain signals of the first number of the existing audio frames with an interval from the current audio frame as an input of the training model; and adjusting model parameters of the audio prediction model according to a difference between the current audio frame and the output result of the training model.

26. An electronic device, comprising:

a memory configured to store a program; and one or more processors configured to run the program stored in the memory, to execute operations comprising:

acquiring time domain signals of a first number of existing audio frames in a case that an audio packet loss occurs;

carrying out acoustic feature extraction on the time domain signals of the first number of the existing audio frames to generate acoustic features of the existing audio frames;

carrying out semantic feature extraction on the time domain signals of the first number of the existing audio frames, and carrying out semantic understanding based on the extracted semantic features to generate semantic expressions corresponding to the existing audio frames; and predicting a time domain signal of a current audio frame according to the acoustic features and the semantic expressions, for audio packet loss compensation.

27. The electronic device of clause 26, wherein the one or more processors are configured to execute operations of carrying out the acoustic feature extraction on the time domain signals of the first number of the existing audio frames to generate the acoustic features of the existing audio frames by:

carrying out, by a one-dimensional convolutional network with multiple branches, acoustic feature extraction on the time domain signals of the first number of the existing audio frames to generate multiple low-dimensional acoustic features; and carrying out aggregation processing on the multiple low-dimensional acoustic features to generate the acoustic features of the existing audio frames.

28. The electronic device of clause 27, wherein the one or more processors are configured to execute operations of carrying out aggregation processing on the multiple low-dimensional acoustic features to generate acoustic features of the existing audio frames by:

aggregating, by an attention module, the multiple low-dimensional acoustic features to generate the acoustic features of the existing audio frames.

29. The electronic device of clause 27 or 28, wherein the one or more processors are configured to run the program stored in the memory, to further execute operations comprising:

buffering acoustic features of a preset number of the existing audio frames, for prediction processing of subsequent audio frames.

30. The electronic device of any of clauses 26-29, wherein the one or more processors are configured to execute operations of carrying out the semantic feature extraction on the time domain signals of the first number of the existing audio frames, and carrying out the semantic understanding based on the extracted semantic features to generate the semantic expressions corresponding to the existing audio frames by:

carrying out, by a one-dimensional convolutional network, the semantic feature extraction on the time domain signals of the first number of the existing audio frames, and carrying out, by a GRU network, semantic understanding based on the extracted semantic features to generate the semantic expressions at a phoneme level corresponding to the existing audio frames.

31. The electronic device of any of clauses 26-30, wherein the one or more processors are configured to execute operations of predicting the time domain signal of the current audio frame according to the acoustic features and the semantic expressions by:

predicting, by a GRU network, the time domain signal of the current audio frame according to the acoustic features and the semantic expressions.

32. The electronic device of clause 31, wherein the GRU network uses sparse model parameters.

33. An electronic device, comprising:

a memory configured to store a program; and one or more processors configured to run the program stored in the memory, to execute operations comprising:

acquiring a time domain signal and a frame state of a current audio frame;

in response to the frame state being a lost state:

predicting the time domain signal of the current audio frame by using an audio prediction model according to time domain signals of a first number of existing audio frames before the current audio frame; and outputting a prediction result as the current audio frame; or in response to the frame state is an intact state:

training the audio prediction model by using the time domain signal of the current audio frame and the time domain signals of the first number of the existing audio frames before the current audio frame as training data;

updating the audio prediction model; and outputting the current audio frame in the intact state.

34. The electronic device of clause 33, wherein the one or more processors are configured to execute operations of predicting the time domain signal of the current audio frame according to the time domain signals of the first number of the existing audio frames before the current audio frame by:

carrying out acoustic feature extraction on the time domain signals of the first number of the existing audio frames to generate acoustic features of the existing audio frames;

carrying out semantic feature extraction on the time domain signals of the first number of the existing audio frames, and carrying out semantic understanding based on the extracted semantic features to generate semantic expressions corresponding to the existing audio frames; and predicting the time domain signal of the current audio frame according to the acoustic features and the semantic expressions.

35. The electronic device of clause 34, wherein the one or more processors are configured to execute operations of carrying out the acoustic feature extraction on the time domain signals of the first number of the existing audio frames to generate the acoustic features of the existing audio frames by:

carrying out, by a one-dimensional convolutional network with multiple branches, the acoustic feature extraction on the time domain signals of the first number of the existing audio frames to generate multiple low-dimensional acoustic features; and carrying out aggregation processing on the multiple low-dimensional acoustic features to generate the acoustic features of the existing audio frames.

36. The electronic device of clause 34 or 35, wherein the one or more processors are configured to execute operations of carrying out the semantic feature extraction on the time domain signals of the first number of the existing audio frames, and carrying out the semantic understanding based on the extracted semantic features to generate the semantic expressions corresponding to the existing audio frames by:

carrying out, by a one-dimensional convolutional network, the semantic feature extraction on the time domain signals of the first number of the existing audio frames, and carrying out, by a GRU network, the semantic understanding based on the extracted semantic features to generate the semantic expressions at a phoneme level corresponding to the existing audio frames.

37. The electronic device of any of clauses 34-36, wherein the one or more processors are configured to execute operations of predicting the time domain signal of the current audio frame according to the acoustic features and the semantic expressions by:

predicting, by a GRU network, the time domain signal of the current audio frame according to the acoustic features and the semantic expressions.

38. The electronic device of any of clauses 34-37, wherein the one or more processors are configured to execute operations of training the audio prediction model by using the time domain signal of the current audio frame and the time domain signals of the first number of the existing audio frames before the current audio frame as the training data by:

adjusting model parameters of the audio prediction model according to a difference between the current audio frame and an output result of a training model by taking the time domain signals of the first number of the existing audio frames that are consecutive with the current audio frame as an input of the training model.

39. The electronic device of any of clauses 34-38, wherein the one or more processors are configured to execute operations of training the audio prediction model by using the time domain signal of the current audio frame and the time domain signals of the first number of the existing audio frames before the current audio frame as the training data by:

carrying out a prediction training for consecutive frame loss, with a preset probability, by using the time domain signals of the first number of the existing audio frames with an interval from the current audio frame as an input of a training model; and adjusting model parameters of the audio prediction model according to a difference between the current audio frame and an output result of the training model.

40. The electronic device of any of clauses 34-39, wherein the audio prediction model is configured in correspondence to a live streaming terminal, and the one or more processors are configured to run the program stored in the memory, to further execute operations comprising:

carrying out fusion processing on multiple audio prediction models at a preset time interval; and configuring the fused audio prediction models in correspondence to each live streaming terminal.

41. The electronic device of clause 40, wherein the fusion processing comprises:

carrying out weighted fusion processing on each live streaming terminal, wherein a weight value of the audio prediction model at a targeted live streaming terminal is greater than weight values of the audio prediction models at other live streaming terminals.

42. The electronic device of any of clauses 33-41, wherein the audio prediction model is a model trained offline by using a comprehensive training data set.

43. A non-transitory computer-readable storage medium storing a set of instructions that are executable by one or more processors of a device to cause the device to perform operations comprising:

acquiring time domain signals of a first number of existing audio frames in a case that an audio packet loss occurs;

carrying out acoustic feature extraction on the time domain signals of the first number of the existing audio frames to generate acoustic features of the existing audio frames;

carrying out semantic feature extraction on the time domain signals of the first number of the existing audio frames, and carrying out semantic understanding based on the extracted semantic features to generate semantic expressions corresponding to the existing audio frames; and predicting a time domain signal of a current audio frame according to the acoustic features and the semantic expressions, for audio packet loss compensation.

44. The non-transitory computer-readable storage medium of clause 43, wherein the set of instructions are executable by the one or more processors of the device to cause the device to carry out the acoustic feature extraction on the time domain signals of the first number of the existing audio frames to generate the acoustic features of the existing audio frames by:

carrying out, by a one-dimensional convolutional network with multiple branches, acoustic feature extraction on the time domain signals of the first number of the existing audio frames to generate multiple low-dimensional acoustic features; and carrying out aggregation processing on the multiple low-dimensional acoustic features to generate the acoustic features of the existing audio frames.

45. The non-transitory computer-readable storage medium of clause 44, wherein the set of instructions are executable by the one or more processors of the device to cause the device to carry out aggregation processing on the multiple low-dimensional acoustic features to generate acoustic features of the existing audio frames by:

aggregating, by an attention module, the multiple low-dimensional acoustic features to generate the acoustic features of the existing audio frames.

46. The non-transitory computer-readable storage medium of clause 44 or 45, wherein the operations further comprise:

buffering acoustic features of a preset number of the existing audio frames, for prediction processing of subsequent audio frames.

47. The non-transitory computer-readable storage medium of any of clauses 43-46, wherein the set of instructions are executable by the one or more processors of the device to cause the device to carry out the semantic feature extraction on the time domain signals of the first number of the existing audio frames, and carry out the semantic understanding based on the extracted semantic features to generate the semantic expressions corresponding to the existing audio frames by:

carrying out, by a one-dimensional convolutional network, the semantic feature extraction on the time domain signals of the first number of the existing audio frames, and carrying out, by a GRU network, semantic understanding based on the extracted semantic features to generate the semantic expressions at a phoneme level corresponding to the existing audio frames.

48. The non-transitory computer-readable storage medium of any of clauses 43-47, wherein the set of instructions are executable by the one or more processors of the device to cause the device to predict the time domain signal of the current audio frame according to the acoustic features and the semantic expressions comprises:

predicting, by a GRU network, the time domain signal of the current audio frame according to the acoustic features and the semantic expressions.

49. The non-transitory computer-readable storage medium of clause 48, wherein the GRU network uses sparse model parameters.

50. A non-transitory computer-readable storage medium storing a set of instructions that are executable by one or more processors of a device to cause the device to perform operations comprising:

acquiring a time domain signal and a frame state of a current audio frame;

in response to the frame state being a lost state:

predicting the time domain signal of the current audio frame by using an audio prediction model according to time domain signals of a first number of existing audio frames before the current audio frame; and outputting a prediction result as the current audio frame; or in response to the frame state is an intact state:

training the audio prediction model by using the time domain signal of the current audio frame and the time domain signals of the first number of the existing audio frames before the current audio frame as training data;

updating the audio prediction model; and outputting the current audio frame in the intact state.

51. The non-transitory computer-readable storage medium of clause 50, wherein the set of instructions are executable by the one or more processors of the device to cause the device to predict the time domain signal of the current audio frame according to the time domain signals of the first number of the existing audio frames before the current audio frame by:

carrying out acoustic feature extraction on the time domain signals of the first number of the existing audio frames to generate acoustic features of the existing audio frames;

carrying out semantic feature extraction on the time domain signals of the first number of the existing audio frames, and carrying out semantic understanding based on the extracted semantic features to generate semantic expressions corresponding to the existing audio frames; and predicting the time domain signal of the current audio frame according to the acoustic features and the semantic expressions.

52. The non-transitory computer-readable storage medium of clause 51, wherein the set of instructions are executable by the one or more processors of the device to cause the device to carry out the acoustic feature extraction on the time domain signals of the first number of the existing audio frames to generate the acoustic features of the existing audio frames by:

carrying out, by a one-dimensional convolutional network with multiple branches, the acoustic feature extraction on the time domain signals of the first number of the existing audio frames to generate multiple low-dimensional acoustic features; and carrying out aggregation processing on the multiple low-dimensional acoustic features to generate the acoustic features of the existing audio frames.

53. The non-transitory computer-readable storage medium of clause 51 or 52, wherein the set of instructions are executable by the one or more processors of the device to cause the device to carry out the semantic feature extraction on the time domain signals of the first number of the existing audio frames, and carry out semantic understanding based on the extracted semantic features to generate the semantic expressions corresponding to the existing audio frames by:

carrying out, by a one-dimensional convolutional network, the semantic feature extraction on the time domain signals of the first number of the existing audio frames, and carrying out, by a GRU network, the semantic understanding based on the extracted semantic features to generate the semantic expressions at a phoneme level corresponding to the existing audio frames.

54. The non-transitory computer-readable storage medium of any of clauses 51-53, wherein the set of instructions are executable by the one or more processors of the device to cause the device to predict the time domain signal of the current audio frame according to the acoustic features and the semantic expressions by:

predicting, by a GRU network, the time domain signal of the current audio frame according to the acoustic features and the semantic expressions.

55. The non-transitory computer-readable storage medium of any of clauses 51-54, wherein the set of instructions are executable by the one or more processors of the device to cause the device to train the audio prediction model by using the time domain signal of the current audio frame and the time domain signals of the first number of the existing audio frames before the current audio frame as the training data by:

adjusting model parameters of the audio prediction model according to a difference between the current audio frame and an output result of a training model by taking the time domain signals of the first number of the existing audio frames that are consecutive with the current audio frame as an input of the training model.

56. The non-transitory computer-readable storage medium of any of clauses 51-55, wherein the set of instructions are executable by the one or more processors of the device to cause the device to train the audio prediction model by using the time domain signal of the current audio frame and the time domain signals of the first number of the existing audio frames before the current audio frame as the training data by:

carrying out a prediction training for consecutive frame loss, with a preset probability, by using the time domain signals of the first number of the existing audio frames with an interval from the current audio frame as an input of a training model; and adjusting model parameters of the audio prediction model according to a difference between the current audio frame and an output result of the training model.

57. The non-transitory computer-readable storage medium of any of clauses 51-56, wherein the audio prediction model is configured in correspondence to a live streaming terminal, and the set of instructions are executable by the one or more processors of the device to cause the device to further perform:

carrying out fusion processing on multiple audio prediction models at a preset time interval; and configuring the fused audio prediction models in correspondence to each live streaming terminal.

58. The non-transitory computer-readable storage medium of clause 57, wherein the fusion processing comprises:

carrying out weighted fusion processing on each live streaming terminal, wherein a weight value of the audio prediction model at a targeted live streaming terminal is greater than weight values of the audio prediction models at other live streaming terminals.

59. The non-transitory computer-readable storage medium of any of clauses 50-58, wherein the audio prediction model is a model trained offline by using a comprehensive training data set.

Finally, it should be noted that the foregoing embodiments are merely used for describing the technical solutions of the present disclosure, but are not intended to limit the present disclosure. Although the present disclosure is described in details with reference to the foregoing embodiments, those of ordinary skill in the art may understand that modifications may still be made to the technical solutions described in the foregoing embodiments, or equivalent replacements may be made to some or all of the technical features. These modifications or replacements will not make the essence of corresponding technical solutions to depart from the scope of the technical solutions in the embodiments of the present disclosure.

What is claimed is:

1. A method for audio packet loss compensation processing, comprising:
    acquiring time domain signals of a first number of existing audio frames in a case that an audio packet loss occurs;
    carrying out acoustic feature extraction on the time domain signals of the first number of the existing audio frames to generate acoustic features of the existing audio frames;
    carrying out, by a one-dimensional convolutional network, semantic feature extraction on the time domain signals of the first number of the existing audio frames, and carrying out, by a GRU network, semantic understanding based on the extracted semantic features to generate semantic expressions at a phoneme level corresponding to the existing audio frames;
    predicting a time domain signal of a current audio frame according to the acoustic features and the semantic expressions, for audio packet loss compensation; and
    performing audio packet loss compensation using the predicted time domain signal.

2. The method of claim 1, wherein: the carrying out acoustic feature extraction on the time domain signals of the first number of the existing audio frames to generate the acoustic features of the existing audio frames comprises:
    carrying out, by the one-dimensional convolutional network with multiple branches, acoustic feature extraction on the time domain signals of the first number of the existing audio frames to generate multiple low-dimensional acoustic features; and
    carrying out aggregation processing on the multiple low-dimensional acoustic features to generate the acoustic features of the existing audio frames.

3. The method of claim 2, wherein: the carrying out aggregation processing on the multiple low-dimensional acoustic features to generate acoustic features of the existing audio frames comprises:
    aggregating, by an attention module, the multiple low-dimensional acoustic features to generate the acoustic features of the existing audio frames.

4. The method of claim 2, further comprising:
    buffering acoustic features of a preset number of the existing audio frames, for prediction processing of subsequent audio frames.

5. The method of claim 1, wherein: the predicting the time domain signal of the current audio frame according to the acoustic features and the semantic expressions comprises:
    predicting, by the GRU network, the time domain signal of the current audio frame according to the acoustic features and the semantic expressions.

6. The method of claim 5, wherein the GRU network uses sparse model parameters.

7. An apparatus for audio packet loss compensation processing, comprising:
    a memory configured to store a program; and
    one or more processors configured to run the program stored in the memory, to execute operations comprising:
    acquiring a time domain signal and a frame state of a current audio frame;
    in response to the frame state being a lost state:
    predicting the time domain signal of the current audio frame by using an audio prediction model according to time domain signals of a first number of existing audio frames before the current audio frame by:
    generating acoustic features of the existing audio frames;
    carrying out, by a one-dimensional convolutional network, semantic feature extraction on the time domain signals of the first number of the existing audio frames, and carrying out, by a GRU network, semantic understanding based on the extracted semantic features to generate semantic expressions at a phoneme level corresponding to the existing audio frames;
    predicting the time domain signal of the current audio frame according to the acoustic features and the semantic expressions; and
    outputting a prediction result as the current audio frame, and performing audio packet loss compensation using the predicted time domain signal; or
    in response to the frame state is an intact state:
    training the audio prediction model by using the time domain signal of the current audio frame and the time domain signals of the first number of the existing audio frames before the current audio frame as training data;
    updating the audio prediction model; and
    outputting the current audio frame in the intact state.

8. The apparatus method of claim 7, wherein: the predicting the time domain signal of the current audio frame according to the time domain signals of the first number of the existing audio frames before the current audio frame further comprises:
    carrying out acoustic feature extraction on the time domain signals of the first number of the existing audio frames to generate the acoustic features of the existing audio frames.

9. The apparatus method of claim 7, wherein: the carrying out the acoustic feature extraction on the time domain signals of the first number of the existing audio frames to generate the acoustic features of the existing audio frames further comprises:
    carrying out, by the one-dimensional convolutional network with multiple branches, the acoustic feature extraction on the time domain signals of the first number of the existing audio frames to generate multiple low-dimensional acoustic features; and
    carrying out aggregation processing on the multiple low-dimensional acoustic features to generate the acoustic features of the existing audio frames.

10. The apparatus method of claim 7, wherein: the predicting the time domain signal of the current audio frame according to the acoustic features and the semantic expressions comprises:

predicting, by the GRU network, the time domain signal of the current audio frame according to the acoustic features and the semantic expressions.

11. The apparatus method of claim 7, wherein: the training the audio prediction model by using the time domain signal of the current audio frame and the time domain signals of the first number of the existing audio frames before the current audio frame as the training data comprises:

adjusting model parameters of the audio prediction model according to a difference between the current audio frame and an output result of a training model by taking the time domain signals of the first number of the existing audio frames that are consecutive with the current audio frame as an input of the training model.

12. The apparatus method of claim 7, wherein: the training the audio prediction model by using the time domain signal of the current audio frame and the time domain signals of the first number of the existing audio frames before the current audio frame as the training data comprises:

carrying out a prediction training for consecutive frame loss, with a preset probability, by using the time domain signals of the first number of the existing audio frames with an interval from the current audio frame as an input of a training model; and adjusting model parameters of the audio prediction model according to a difference between the current audio frame and an output result of the training model.

13. The apparatus method of claim 7, wherein: the audio prediction model is configured in correspondence to a live streaming terminal, and the method further comprises:

carrying out fusion processing on multiple audio prediction models at a preset time interval; and configuring the fused audio prediction models in correspondence to each live streaming terminal.

14. The apparatus method of claim 13, wherein the fusion processing comprises:

carrying out weighted fusion processing on each live streaming terminal, wherein a weight value of the audio prediction model at a targeted live streaming terminal is greater than weight values of the audio prediction models at other live streaming terminals.

15. The apparatus method of claim 7, wherein the audio prediction model is a model trained offline by using a comprehensive training data set.

16. An electronic device, comprising:

a memory configured to store a program; and one or more processors configured to run the program stored in the memory to cause the electronic device to perform operations comprising:

acquiring time domain signals of a first number of existing audio frames in a case that an audio packet loss occurs;

carrying out acoustic feature extraction on the time domain signals of the first number of the existing audio frames to generate acoustic features of the existing audio frames;

carrying out, by a one-dimensional convolutional network, semantic feature extraction on the time domain signals of the first number of the existing audio frames, and carrying out, by a GRU network, semantic understanding based on the extracted semantic features to generate semantic expressions at a phoneme level corresponding to the existing audio frames;

predicting a time domain signal of a current audio frame according to the acoustic features and the semantic expressions, for audio packet loss compensation; and performing the audio packet loss compensation using the predicted time domain signal.

17. The electronic device of claim 16, wherein the one or more processors are configured to execute operations of carrying out the acoustic feature extraction on the time domain signals of the first number of the existing audio frames to generate the acoustic features of the existing audio frames by:

carrying out, by the one-dimensional convolutional network with multiple branches, acoustic feature extraction on the time domain signals of the first number of the existing audio frames to generate multiple low-dimensional acoustic features; and carrying out aggregation processing on the multiple low-dimensional acoustic features to generate the acoustic features of the existing audio frames.

18. The electronic device of claim 17, wherein the one or more processors are configured to execute operations of carrying out aggregation processing on the multiple low-dimensional acoustic features to generate acoustic features of the existing audio frames by:

aggregating, by an attention module, the multiple low-dimensional acoustic features to generate the acoustic features of the existing audio frames.

* * * * *